United States Patent [19]

Tomalin et al.

[11] Patent Number: 4,740,666
[45] Date of Patent: Apr. 26, 1988

[54] ELECTRICAL DISCHARGE MACHINING ELECTRODE

[75] Inventors: Dandridge S. Tomalin, Chagrin Falls; John Capp, Willowick, both of Ohio

[73] Assignee: General Electric Company, Schenectady, N.Y.

[21] Appl. No.: 901,087

[22] Filed: Aug. 28, 1986

[51] Int. Cl.⁴ .................. B23H 7/08; B23H 1/04; B05D 5/12

[52] U.S. Cl. .................. 219/69 W; 427/118; 427/122; 428/618; 428/677

[58] Field of Search ............... 219/69 W, 146.1, 69 E; 428/617, 618, 677, 681, 682; 427/59, 61, 118, 122, 123

[56] References Cited

U.S. PATENT DOCUMENTS

| | | | |
|---|---|---|---|
| 2,317,350 | 4/1943 | Adler et al. | 428/677 |
| 2,378,458 | 6/1945 | Avallone | 428/677 |
| 2,904,717 | 9/1959 | Kerstetter | 427/122 |
| 3,008,201 | 11/1961 | Carreker, Jr. | 22/57.2 |
| 3,060,053 | 10/1962 | Carreker, Jr. et al. | 117/51 |
| 4,287,404 | 9/1981 | Convers et al. | 219/69 W |
| 4,341,939 | 7/1982 | Briffod et al. | 219/69 W |
| 4,686,153 | 8/1987 | Tominaga et al. | 219/69 W |

FOREIGN PATENT DOCUMENTS

| | | | |
|---|---|---|---|
| 623087 | 7/1961 | Canada | 428/677 |
| 701901 | 1/1965 | Canada | 427/122 |
| 714011 | 7/1965 | Canada | 427/122 |
| 793785 | 9/1968 | Canada | 428/677 |
| 53-22930 | 7/1978 | Japan | 219/146.1 |
| 155127 | 9/1983 | Japan | 219/69 W |
| 645831 | 10/1984 | Switzerland | 219/69 W |

OTHER PUBLICATIONS

"Metal Deformation Processes", edited by Schey, pp. 510, 511, 524–527, published 1970.
*Metals Handbook*, edited by Lyman, 1948 edition, pp. 69 and 70.
"Tungsten" by C. J. Smithells, Chapman and Hill (1952), pp. 106–111.

Primary Examiner—G. P. Tolin
Assistant Examiner—Geoffrey S. Evans
Attorney, Agent, or Firm—Philip L. Schlamp; J. F. McDevitt; Edward M. Corcoran

[57] ABSTRACT

An improved electrical discharge machining electrode permitting improved cutting action to be achieved at the same level of electrical power being applied to the wire electrode. Such improvement is attributable to a particular configuration and the material being employed in the wire electrode which has an iron alloy core coated with an intermediate layer including a copper and zinc heat reaction product on which is deposited an adherent carbon surface coating. The improved method and apparatus for employment of this electrode is also described along with one method to form the multilayer coating on the electrode wire core.

26 Claims, 1 Drawing Sheet

ELECTRICAL DISCHARGE MACHINING ELECTRODE

RELATED PATENT APPLICATION

In an earlier U.S. patent application Ser. No. 888,680 filed July 24, 1986 in the name of D. S. Tomalin, and assigned to the assignee of the present invention, there is disclosed an electrical discharge machining electrode comprising an electrically conductive metal wire having an adherent carbon surface coating. A preferred embodiment of said wire electrode employs a molybdenum metal core having an oxidized surface and on which a surface carbon coating is deposited. In a different embodiment, a copper clad iron alloy wire produced by the well known dip-forming process is oxidized to provide a better metallurgically bonded substrate for the surface carbon coating.

BACKGROUND OF THE INVENTION

A known wire electrode member and apparatus for electrical discharge machining is described in U.S. Pat. No. 4,287,404 wherein the electrically conductive metal wire is provided with an active surface comprising at least 50% by weight of a metal or alloy selected from a group consisting of zinc, cadmium, tin, lead, antimony and bismuth. In the employment of said type machining electrode, the active surface coating is continuously replenished during the machining operation by passage through an electrolytic bath containing the selected active metal. Such continuous replenishment of the active surface while the workpiece is being machined understandably renders the equipment more complex to build and operate. Moreover, the replated wire electrode is said to further require resizing with a die prior to its being fed to the machining zone.

In the aforementioned pending U.S. patent application, an adherent carbon coating provides the active surface for said electrical discharge machining electrode to provide a higher metal removal rate from the workpiece without accompanying need to continuously replace the active surface material. Other benefits attributable to said carbon or graphite surface on the machining electrode include low friction with the wire guides enabling offset of the wire electrodes member for taper cuts and/or higher back tensions which is desirable for wire alignment without producing vibration. As further indicative of these benefits, a 0.004 inch diameter electrode having the carbon surface coating deposited on a molybdenum core permitted machining of tool steel at thicknesses up to 4 inches with only a minor reduction in the metal removal rate at increased workpiece thickness and no wire breakage.

It still remains desirable, however, to further improve the cutting action achieved with said carbon coated wire electrode members with respect to both cutting speed and surface finish.

A further desirable objective is to improve the cutting action for this type wire electrode without requiring that the machining process or apparatus utilize higher levels of electrical power to achieve the same degree of cutting action.

Other objectives of the present invention will be apparent in the following detailed description.

SUMMARY OF THE INVENTION

It has now been found, surprisingly, that a particular configuration for this type electrical discharge machining electrode wire provides improved cutting action wherein said machining process can be carried out at the same level of electrical power being applied to said wire electrode. More particularly, the presently improved wire electrode member provides faster cutting action at the same wire diameter than the aforementioned carbon coated molybdenum core wire and does so with no increase in the level of electrical power that is applied to the electrode. A further related benefit has been discovered with respect to such utilization of the present improved electrode whereby the surface finish in the region of the metal workpiece where cutting action has occurred is also related to the cutting speed and with both of said operating parameters being further related to the current level applied to this wire electrode. As has been determined in this regard, an increase in cutting speed produces rougher surface finish and with increased current levels being applied to the wire electrode yielding a rougher surface finish and/or a faster cutting speed. An advantage derived from such relationship is to produce a smoother surface finish with less current being supplied to the wire electrode member at a given cutting speed.

The novel wire electrode member according to the present invention comprises an iron alloy core coated with an intermediate layer including a copper and zinc heat reaction product on which is deposited an adherent carbon surface coating. A preferred method of fabricating said wire electrode member employs a ferrous alloy metal core, such as nickel-iron or low carbon steel which has been copper clad by an already well known dip-forming process and deposits the zinc coating on said copper clad member by other also well known techniques such as electroplating or immersion in a bath of molten metal. Preferably, the copper clad core utilizes a sufficient copper thickness such that it becomes only partially converted during a subsequent heat treatment to produce alloying action with the overlying zinc coating. In said regard, the copper clad wire now sold by General Electrical Company under the tradename "Cumet" and which exhibits electrical conductivity approximately 60% that exhibited by OFHC copper wire is a preferred core material as compared with the Cumet wire having a lesser copper cladding and exhibiting only 40% of said electrical conductivity standard. Accordingly, a zinc coating in the thickness range of 0.004 inch or greater for a 0.030 inch diameter size of the 60% Cumet wire has been found to retain a residual copper layer beneath the alloyed copper and zinc medium in the final electrode member and which is believed to further enhance electrical power delivery to the spark discharge. The zinc coated intermediate product is next coated with a commercial liquid suspension of graphite, such as "Aquadag" or "Electrodag" which are both products sold by the Acheson Colloids Company. The latter graphite coating material is preferred for the present electrode member by reason of its higher electrical conductivity thereby enabling higher energy delivery by the finished electrode to the metal workpiece. Subsequent heating of such multilayer coated iron alloy wire under conditions producing an alloying reaction between the underlying zinc and copper substrates in said coating results in the desired metallurgical bonding of the above defined intermediate metal layers with further mechanical bonding of the overlying surface carbon particulates. Such mechanical bonding of the active carbon surface is also believed to be a contributing factor for the improved performance discovered by enhancing thermal and electrical conductivity in the wire electrode member. A final step in such wire electrode fabrication which further improved mechanical adherence by a consolidation of the still porous active carbon surface is reducing the wire diameter to its final desired size by conventional mechanical drawing action with a graphite lubricant.

Superior cutting action by the presently improved wire electrode member is believed primarily attributable to the above defined novel construction. The iron alloy core permits the electrode member to carry higher loads through the machining zone when used lessening the incidence of wire breakage as well as improving the accuracy of the cutting action. Longer continuous cutting action is thereby made possible with said electrode construction. While such core portion is initially produced in the preferred embodiments by means of a dip-forming process (as further described in U.S. Pat. Nos. 3,008,201 and 3,060,053) and lacks optimum physical strength due to an annealed condition produced when the zinc coated core is thermally processed, the mechanical drawing step subsequently given to the fabricated electrode member raises the strength for said overall construction. Thus, the ultimate tensile strength of this final electrode construction having a low carbon steel core has been found to exceed that for a conventional brass EDM wire electrode by at least 25% at the discharge machining temperatures. The copper and zinc alloy inner layer of the present electrode surface contributes to a faster cutting action from improved flushing activity in the discharge machining zone. As previously indicated, some retention of an unconverted copper layer in said intermediate layer construction is preferred to increase both thermal and electrical conductivity in the final electrode member. Such innerlayer construction helps offset both lower thermal and electrical conductivity of the iron alloy core thereby enhancing higher metal removal rates. Further improved bonding of an active carbon surface in the present electrode member by means of said copper and zinc innerlayer should also enhance metal removal rates by delivering electrical power to the spark discharge more effectively.

Accordingly, a preferred wire electrode member fabricated in the above described manner utilizes a low carbon steel alloy core clad with sufficient copper to exhibit electrical conductivity approximately 60% that exhibited by OFHC copper wire at an initial wire diameter size of 0.025 inch. The copper clad wire is thereafter zinc plated by conventional electroplating to plating thicknesses of 0.003–0.004 inch and then coated with the above specified graphite materials preparatory to heating at the elevated temperatures forming a partial or complete alloy between the copper and zinc undercoatings. Satisfactory alloying action can be achieved by transporting the multilayer coated wire electrode through a hydrogen atmosphere furnace heated to approximately 750° C. at a 10 foot per minute wire travel speed. It is desirable to completely react the zinc layer with the underlying copper substrate in said manner since unalloyed zinc has been found harmful when subjecting the fabricated wire to a subsequent wire drawing action. In said preferred alloying action, the intermediate copper and zinc layer will be of equal thickness to the thickness of the underlying unalloyed copper layer. The heat treated wire is finally reduced in size by said mechanical drawing action to approximately 0.004–0.012 inch diameter which desirably increases its mechanical strength after the preceding annealing action. A different wire electrode member according to the present invention and which can be produced in the same general manner features a nickel-iron core with an intermediate layer of a brass alloy formed by partial conversion of the underlying copper and zinc coatings as above described.

Carrying out the electrical discharge machining process according the present invention generally comprises moving the electrically charged wire electrode member in close proximity to a metal workpiece so as to cause a spark discharge. therebetween, said wire electrode member having the hereinbefore described configuration, contacting the gap space between said workpiece surface and the moving wire electrode member with a moving dielectric liquid, removing metal from the workpiece and carbon from the wire electrode member with said spark discharge, and displacing the removed metal and carbon from the gap space in the moving dielectric fluid. In accordance with said machining process, a conventional EDM machine such as the commercially available ELOX equipment is supplied with a spool of the present wire electrode material for single pass mode of operation. The surface graphite along with the intermediate copper and zinc alloy are volatilized during such operation with the volatilized by-products providing effective flushing of the gap space and with the cutting action thereby achieved in said process being superior at the same level of electrical power being applied to said wire electrode. As hereinbefore indicated, said improved cutting action can be increased cutting speed at the same electrical power level as compared with prior art wire electrodes or a smoother surface finish being achieved at a given speed with less current being applied to the present wire electrode.

DESCRIPTION OF THE PREFERRED EMBODIMENTS

Figure 1:
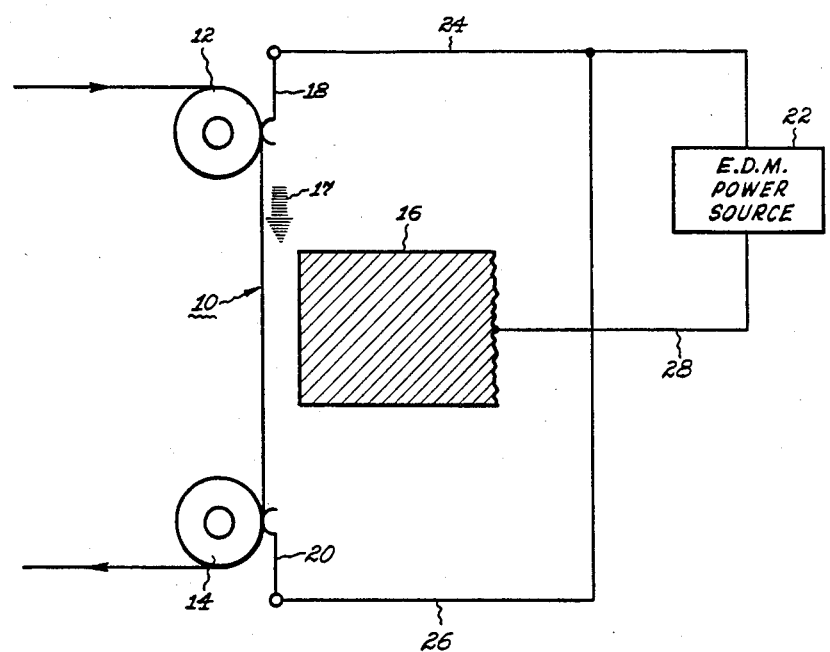
FIG. 1 is a schematic view depicting the major component parts of an improved EDM apparatus according to the present invention.

In FIG. 1 is shown a fragmentary view depicting the present wire electrode member 10 while being used in the operation of an otherwise conventional EDM machine. Said wire electrode member 10 is suspended between a pair of guide rollers 12 and 14 to travel downwardly in a vertical direction and produce a spark discharge (not shown) causing the machining action to take place. The metal workpiece 16 being machined in said manner is positioned in close proximity to said continuously moving electrode wire member at a distance producing the spark discharge therebetween when said wire electrode member and workpiece are properly interconnected in a conventional EDM electrical circuit. More particularly, said electrical circuit employs a pair of brush contact 18 and 20 to contact said electrode member and which are suitably further connected by conductors 24 and 26, respectively, to a conventional EDM power source 22. Electrical connection of said EDM power source by a further conductor 28 completes the required electrical circuit. A supply of moving dielectric fluid 17 such as deionized water is also provided at the gap space location to remove the metal particulates caused by action of the spark discharge and the workpiece along with the carbon particulates and subjacent alloy being volatilized from the present wire electrode member during such use.

To further illustrate more specifically the nature of the present improvement in cutting speed achieved in accordance with the present invention there is provided in the following Table a representative comparison of cutting speed achieved with the present wire electrode configuration as compared with prior art brass and zinc coated brass wire electrodes. Relative values for the electrical power being applied to said electrodes during the cutting action are also given in said Table to illustrate the degree of improvement in cutting speed for the present electrode at comparable power values. In said comparison test, the workpiece consisted of a one inch thick carbon tool steel plate being machined in the above described manner with the particular commercial EDM machines also identified in said Table:

TABLE

| Type Electrode | Cutting Speed (In²/hr) | Relative Power |
|---|---|---|
| Machine #1 (Agietron 425) | | |
| Uncoated brass | 3.5 | 4.8 |
| Cumet (graphite/zinc coated) | 5.0 | 8.5 |
| Brass (zinc coated) | 4.6 | 6.5 |
| Machine #2 (Agietron 315) | | |
| Uncoated brass | 4.2 | 2.5 |
| Uncoated brass | 5.3 | 2.8 |
| Uncoated brass | 5.2 | 3.0 |
| Uncoated brass | 5.9 | 3.2 |
| Uncoated brass | 6.2 | 3.5 |
| Cumet (graphite/zinc coated) | 4.8 | 2.5 |
| Cumet (graphite/zinc coated) | 5.5 | 2.8 |
| Cumet (graphite/zinc coated) | 6.4 | 3.2 |
| Cumet (graphite/zinc coated) | 8.0 | 4.5 |
| Cumet (graphite/zinc coated) | 8.1 | 5.1 |
| Cumet (graphite/zinc coated) | 9.0 | 5.4 |
| Cumet (graphite/zinc coated) | 9.2 | 5.5 |

The above values clearly evidence a superiority in cutting speed for a preferred Cumet wire electrode having the graphitized surface coating of the present invention at the 0.010 inch diameter of the tested electrodes. In the machine #1 comparison, the preferred Cumet wire electrode of the invention exhibited a 43% increase in cutting speed as compared with an uncoated brass wire and a 9% cutting speed increase as compared with a zinc coated brass wire. The machine #2 comparison further illustrates such cutting action improvement over the same uncoated brass wire at all levels of electrical power being applied to each type electrode. While it should be noted in the foregoing comparisons that the particular modified Cumet wire tested had been fabricated with copper clad wire exhibiting the preferred 60% electrical conductivity before modification, a lesser thickness copper clad wire fabrication also demonstrates this improvement over the same prior art EDM electrodes. For example, other Cumet wire clad with a copper thickness exhibiting but 40% electrical conductivity as compared with OFHC copper wire but otherwise processed according to the present invention has also been found superior in cutting action to said prior art electrodes.

Figure 2:
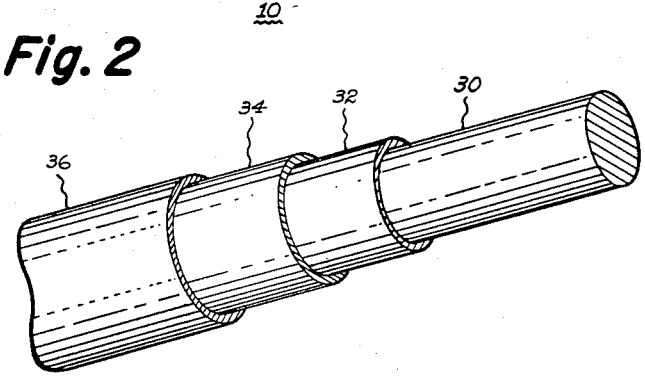
FIG. 2 is a perspective view for a preferred wire electrode member which depicts the present multilayer coated construction.

In FIG. 2, there is shown in perspective the composite construction of a preferred wire electrode member according to the present invention. Specifically, said wire electrode member 10 consists of an iron alloy core 30, having intermediate layers of unalloyed copper 32 supporting a copper and zinc alloy layer 34 formed in the hereinbefore described manner and which serve to mechanically bond a surface carbon coating 36 deposited thereon. The particular wire electrode of the invention employed in the foregoing test comparison was fabricated in such manner commencing with a 0.003 inch thickness zinc electroplate having been deposited on the surface of a 0.025 inch diameter Cumet wire. An Electrodag graphite surface coating was thereafter applied and followed by heat treatment employed to convert a major portion of the zinc and copper coatings to a brass alloy. After recoating the heat treated wire with an Electrodag deposit, the final wire diameter of 0.010 inch was provided by mechanical drawing action.

It will be apparent from the foregoing description that a generally useful electrical discharge machining electrode has been provided along with modifications in the machining process and apparatus utilizing such improved electrode construction. It will be apparent to those skilled in the art, however, that compositional variations can be made in the iron alloy core of said electrode member as well as the intermediate copper and zinc shell enveloping said iron alloy core for the purpose of still further improving the cutting action achieved with this type electrode construction. For example, it is contemplated that routine adjustment in the thickness of an unreacted copper intermediate layer in the final electrode member could provide even further increase in the cutting speed at still lower levels of electrical power being applied to said wire electrode. Accordingly, it is intended to limit the scope of the present invention only by the scope of the following claims.

What we claim as new and desire to secure by Letters Patent of the United States is:

1. An electrical discharge machining electrode wire having an iron alloy core coated with intermediate layers of copper supporting a copper and zinc alloy layer on which is deposited an adherent carbon surface coating.

2. An electrode wire as in claim 1 wherein said surface carbon coating is graphite.

3. An electrode wire as in claim 2 wherein said surface carbon coating is an electrically conductive form of graphite.

4. An electrode wire as in claim 1 wherein said iron alloy core is a low carbon steel alloy.

5. The wire of claim 1 wherein said copper and zinc alloy comprises a copper and zinc heat reaction product.

6. The wire of claim 5 wherein said carbon coating is graphite.

7. The wire of claim 6 wherein said carbon coating is an electrically conductive form of graphite.

8. The wire of claim 6 wherein said core is a steel alloy.

9. An electrical discharge machining process which comprise;
  (a) continuously moving an electrically charged wire electrode member in close proximity to a metal workpiece so as to cause a spark discharge therebetween, said wire electrode member comprising an iron alloy core coated with intermediate layers of copper supporting a copper and zinc alloy layer on which is deposited an adherent carbon surface coating;

(b) contacting the gap space between said workpiece surface and the moving wire electrode member with a moving dielectric liquid, and (c) cutting metal from the workpiece and removing carbon from the wire electrode with said spark discharge and displacing the removed metal and carbon from the gap space in the moving dielectric liquid, wherein improved cutting action is achieved in said process at the same level of electrical power being applied to said wire electrode.

10. A process in claim 9 wherein said improved cutting action is a smoother surface finish.

11. A process as in claim 9 wherein the surface carbon coating of said wire electrode is graphite.

12. A process as in claim 9 wherein the iron alloy core of said wire electrode is a low carbon steel alloy.

13. A process as in claim 9 wherein the intermediate layer of said wire electrode is a brass alloy supported on a residual copper layer.

14. A process as in claim 9 wherein said improved cutting action is increased cutting speed.

15. The process of claim 9 wherein said copper and zinc alloy comprises a copper and zinc reaction product.

16. In combination with an electrical discharge machining apparatus which includes a wire electrode member caused to move continuously in close proximity to the workpiece and produce a spark discharge in the gap space by which said workpiece is machined by cutting action, the improvement wherein said wire electrode member comprises an iron alloy core coated with intermediate layers of copper supporting a copper and zinc alloy layer on which is deposited an adherent carbon surface coating.

17. An apparatus as in claim 16 wherein the intermediate layer of said wire electrode is a brass alloy.

18. An apparatus as in claim 16 which includes means to adjust the level of electrical power being applied to said wire electrode for improved cutting action.

19. An apparatus as in claim 16 wherein said improved cutting action is increased cutting speed.

20. An apparatus as in claim 16 wherein said improved cutting action is a smoother surface finish.

21. An apparatus as in claim 16 wherein the surface carbon coating of said wire electrode is graphite.

22. An apparatus as in claim 16 wherein the iron alloy core of said wire electrode is a low carbon steel alloy.

23. The process of claim 16 wherein said copper and zinc alloy comprises a copper and zinc reaction product.

24. A process to produce an electrical discharge machining electrode wire which comprises:

(a) forming an iron alloy wire having a copper cladding, (b) depositing a zinc coating on the copper clad iron alloy wire, (c) depositing a carbon coating on the surface of the copper and zinc coated iron alloy wire, (d) heating said copper and zinc coated iron alloy wire under conditions which produce alloying action in said coating between the copper and zinc components, and (e) reducing the diameter of carbon coated iron alloy wire by mechanical drawing action.

25. A process as in claim 24 wherein the zinc and copper coated iron alloy wire is heated to approximately 750° C. under conditions producing a brass alloy.

26. A process as in claim 24 wherein the zinc coating is deposited by electrodeposition.

* * * * *